(12) United States Patent
Tsubokura

(10) Patent No.: US 7,929,074 B2
(45) Date of Patent: Apr. 19, 2011

(54) LIQUID CRYSTAL DISPLAY DEVICE

(75) Inventor: Masaki Tsubokura, Mobara (JP)

(73) Assignee: IPS Alpha Technology, Ltd., Chiba (JP)

( * ) Notice: Subject to any disclaimer, the term of this patent is extended or adjusted under 35 U.S.C. 154(b) by 203 days.

(21) Appl. No.: 12/232,859

(22) Filed: Sep. 25, 2008

(65) Prior Publication Data

US 2009/0086122 A1 Apr. 2, 2009

(30) Foreign Application Priority Data

Sep. 27, 2007 (JP) ................................. 2007-250666

(51) Int. Cl.
*G02F 1/1335* (2006.01)
(52) U.S. Cl. ........................................................ 349/58
(58) Field of Classification Search .............. 349/70–71, 349/58; 362/97.1, 97.2, 97.4, 613, 614
See application file for complete search history.

(56) References Cited

U.S. PATENT DOCUMENTS

| | | | | |
|---|---|---|---|---|
| 7,434,957 B2 * | 10/2008 | Kim et al. | ....................... | 362/225 |
| 7,573,542 B2 * | 8/2009 | Tsubokura et al. | .............. | 349/60 |
| 2005/0265047 A1 | 12/2005 | Yun et al. | | |
| 2006/0126321 A1 * | 6/2006 | Lim | ................... | 362/29 |

FOREIGN PATENT DOCUMENTS

JP 2005-347259 5/2005

\* cited by examiner

*Primary Examiner* — Mark A Robinson
*Assistant Examiner* — Eric Wong
(74) *Attorney, Agent, or Firm* — Stites & Harbison, PLLC; Juan Carlos A. Marquez, Esq.

(57) ABSTRACT

An object of the invention is to provide a liquid crystal display device having a so-called direct backlight where the interval between a number of rod light sources can be reduced, as well as a liquid crystal display device where the liquid crystal display panel and the backlight can be provided close to each other and the thickness of the module can be reduced. The liquid crystal display device is provided with a liquid crystal display panel and a backlight provided on the rear surface of this liquid crystal display panel, and the above described backlight is provided with a number of rod light sources aligned in a plane which faces said liquid crystal display panel and electrode supports for supporting the electrodes of the rod light sources on the same pole, which are provided on the same side of the rod light sources together. The above described electrode supports for supporting the electrodes on the same pole together are formed of at least a separate first electrode support and second electrode support. The first electrode support and the second electrode support are respectively formed by press processing a metal plate and provided with electrode fixtures for sandwiching the electrodes of the number of rod light sources and en electrode linking body for linking these electrode fixtures together. The metal fixtures of the first electrode support and the metal fixtures of the second electrode support alternate in the direction in which said rod light sources are aligned.

1 Claim, 8 Drawing Sheets

LIQUID CRYSTAL DISPLAY DEVICE

The present application claims priority over Japanese Application JP 2007-250666 filed on Sep. 27, 2007, the contents of which are hereby incorporated into this application by reference.

BACKGROUND OF THE INVENTION (1) Field of the Invention

The present invention relates to a liquid crystal display device and, in particular, to a liquid crystal display device having a so-called direct backlight.

(2) Related Art Statement

So-called direct backlights are used in liquid crystal display devices for large-scale liquid crystal display panels.

The light source used as a backlight is a rod light source, such as cold cathode fluorescent lamps (CCFL) or external electrode fluorescent lamps (EEFL), or a dot light source, such as LED's.

From among these, EEFL's have increasingly been used, because fluorescent lamps to be controlled are aligned and thus easy to assemble.

Concretely, a number of EEFL's; that is, fluorescent lamps, are uniformly provided in parallel in a plane facing a liquid crystal display panel, and these fluorescent lamps are supported by a base (lower frame) in a housing where a reflective sheet is provided on the inner surface via electrode supports.

The electrode supports are formed as pairs: one on either side of the base, on the short sides.

These electrode supports are provided integrally with at least a number of electrode fixtures, each of which pinches an electrode of one EEFL and an electrode connecting body for connecting and supporting these electrode fixtures, and formed by press processing a metal plate.

That is to say, the electrode fixtures are formed of a branched member for pressing the facing sides of each electrode of the EEFL, by cutting out an electrode fixture from a metal plate in plane form together with the above described electrode connecting body, and at the same time, bending the above descried electrode fixture up from the above described electrode connecting body.

A liquid crystal display device having such a configuration is disclosed in the following Patent Document 1, for example.

(Patent Document 1) Japanese Unexamined Patent Publication 2005-347259 (Corresponding U.S. Application US2005/0265047 A1)

SUMMARY OF THE INVENTION

Disclosure Of The Invention (Problem to Be Solved by the Invention)

In liquid crystal display devices having this configuration, it has been desired for the interval between a number of rod light sources which are aligned to be smaller.

When a number of rod light sources are aligned with small intervals, light can be made uniform in a plane slightly at a distance and parallel to a plane including the rod light sources, and a liquid crystal display panel can be placed in the above described plane, where light is uniform.

As a result, the liquid crystal display panel and the backlight (specifically, rod light sources) can be provided close to each other, and thus, the thickness of the module can be reduced.

The above described electrode supports for supporting the number of EFL's are formed by press processing one metal plate. In order to form metal fixtures for sandwiching electrodes of EEFL's having a sufficient height on the surface of the metal plate in plane form, it is necessary for there to be a certain interval between the metal fixtures.

Thus, a certain distance must be secured between the metal fixtures formed adjacent to each other as described above, and there is difficulty in reducing the interval between a number of rod light sources.

An object of the present invention is to provide a liquid crystal display device having a so-called direct backlight where a number of rod light sources can be provided at small intervals.

Another object of the present invention is to provide a liquid crystal display device where the liquid crystal display panel and the backlight can be provided close to each other, so that the thickness of the module can be reduced.

(Means for Solving Problem)

The gist of typical inventions from among the inventions disclosed in the present specification is briefly described below.

(1) The liquid crystal display device according to the present invention is provided with a liquid crystal display panel and a backlight provided on the rear surface of this liquid crystal display panel, for example, and characterized in that the above described backlight comprises a number of rod light sources installed in parallel, and electrode supports for supporting electrodes of the number of rod light sources together, the above described electrode supports are formed of a separate first electrode support and second electrode support, the above described first electrode support and the above described second electrode support are respectively formed of a number of electrode connecting bodies parallel to the longitudinal direction of the electrodes of the above described rod light source, and a number of electrode fixtures for sandwiching the electrodes of the above described rod light source provided in each electrode connecting body, and the electrode connecting bodies of the above described first electrode support and the electrode connecting bodies of the above described second electrode support alternate in the direction perpendicular to the longitudinal direction of the above described rod light sources.

(2) The liquid crystal display device according to the present invention is provided with a liquid crystal display panel and a backlight provided on the rear surface of this liquid crystal display panel, for example, and characterized in that the above described backlight comprises a number of rod light sources installed in parallel, and electrode supports for supporting electrodes of the number of rod light sources together, the above described electrode supports are provided with a first electrode linking body, a second electrode linking body and a third electrode linking body which extend in the direction in which the above described rod light sources are aligned and are aligned in parallel, and a number of electrode connecting bodies formed so as to be parallel to each other in the direction of the length of the above described rod light sources between the above described first electrode linking body and the above described second electrode body, as well as between the above described second electrode linking body and the above described third electrode linking body, each electrode connecting body is formed of a number of electrode fixtures for sandwiching an electrode, and electrode connecting bodies between the above described first electrode linking body and the above described second electrode linking body, as well as electrode connecting bodies between the above described second electrode linking bodies and the above described third electrode linking bodies, alternate in the direction perpendicular to the longitudinal direction of the above described rod light sources.

(3) The liquid crystal display device is provided with a liquid crystal display panel and a backlight provided on the rear surface of this liquid crystal display panel, for example, and characterized in that the above described backlight comprises a number of rod light sources installed in parallel, and electrode supports for supporting electrodes of the number of rod light sources together, the above described electrode supports are formed so as to comprise a number of electrode connecting bodies formed in parallel to the direction of the length of the electrodes of the above described rod light sources, and a number of electrode fixtures for sandwiching the electrodes of the above described rod light sources provided to respective electrode connecting bodies, the above described electrode fixtures are formed on the above described electrode connecting bodies so as to be parallel in the longitudinal direction of the above described rod light sources, and the above described number of electrode fixtures alternate with a number of electrode fixtures on an adjacent electrode connecting body in the direction perpendicular to the longitudinal direction of the above described light sources.

Here, the present invention is not limited to the above described configuration, and various modifications are possible, as long as the technical idea of the present invention is not deviated from.

(Effects of the Invention)

In the liquid crystal display device formed as described above, it becomes possible to form a so-called direct backlight where the interval between a number of rod light sources is reduced.

In the liquid crystal display device formed as described above, it becomes possible to provide a liquid crystal display panel and a backlight close to each other, so that the thickness of the module can be reduced.

EXPLANATION OF SYMBOLS

PNL . . . liquid crystal display panel
OS . . . optical sheet
BL . . . backlight
SUB1, SUB2 . . . substrates
SCD . . . semiconductor device
PCB1, PCB2 . . . printed circuit boards
DFR . . . lower frame
RS . . . reflective sheet
BWh . . . side wall plate
EFL . . . external electrode fluorescent lamps
CC . . . notches
MFR . . . middle frame
UFR upper frame
TMT . . . electrode base
SC . . . screws
TMS, TMSa, TMSb . . . electrode supports
TJCa, TJCb, TJCc . . . electrode linking bodies
TCNa, TCNb . . . electrode connecting bodies
TMF, TMFa1, TMFa2, TMFa3, TMFb1, TMFb2, TMFb3 . . . electrode fixtures
WBa, WBb . . . wide portions
TN . . . electrode sandwiching portion
TI . . . electrode inserting portion
PJB . . . protruding plate
CLT1, CLT2 . . . unwoven cloth

DETAILED DESCRIPTION OF THE INVENTION

Best Mode For Carrying Out The Invention

In the following, the embodiments of the liquid crystal display device according to the present invention are described in reference to the drawings.

<Configuration of Entirety>

Figure 2:
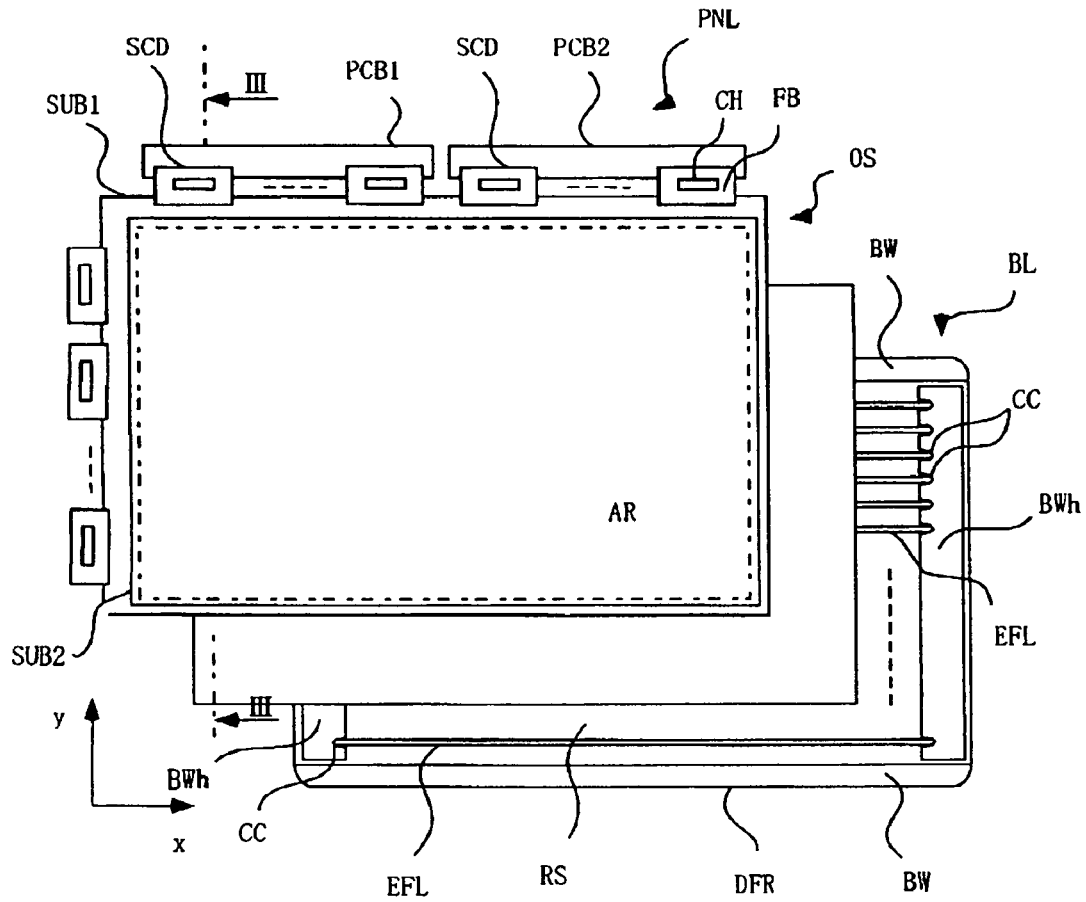
FIG. 2 is a diagram schematically showing the configuration of the liquid crystal display device according to one embodiment of the present invention.

FIG. 2 is a diagram schematically showing the configuration of the liquid crystal display device according to one embodiment of the present invention.

First, a liquid crystal display panel PNL, an optical sheet OS and a backlight BL are provided in this order from the viewer side.

The liquid crystal display panel PNL has a pair of parallel substrates SUB1 and SUB2 made of glass, for example, as outside walls, and liquid crystal intervenes between these substrates SUB1 and SUB2 in the configuration.

Pixels (not shown) arranged in a matrix are formed on the surface of the above described substrates SUB1 and SUB2 on the liquid crystal side with the above described liquid crystal as one component, and these pixels can control the light transmittance of the liquid crystal.

In addition, the region where these pixels are formed is a liquid crystal display region AR (region surrounded by frame of single-dot chain line), and the entirety of the liquid crystal display region AR is irradiated with light from the below described backlight BL, so that the viewer sees an image through light that transmits through the respective pixels.

The substrate SUB1 on the rear of the display from the viewer's point of view has portions exposed from the substrate SUB2 on the left side and the upper side in the figure, so that one side of a number of semiconductor devices SCD can be connected through these portions. The semiconductor devices SCD are formed of so-called tape carrier type semiconductor devices, where semiconductor chips CH are mounted on the upper surface of flexible substrates FB on which wires are formed.

These semiconductor devices SCD are formed of circuits for individually driving the respective pixels described above. Printed circuit boards PCB1 and PCB2 are connected to the second side, which faces the first side, to which the above described substrate SUB1 is connected are connected to semiconductor devices SCD aligned in the direction x in the figure from among the respective semiconductor devices SCD (video signal driving circuits), so that an external input signal can be inputted via the printed circuit board PCB1.the liquid crystal display device in the present embodiment is large-scale, and two printed circuit boards PCB1 and PCB2 are formed side-by-side, for example.

In addition, semiconductor devices SCD aligned in the direction y in the figure from among the above described semiconductor devices SCD (scanning signal driving circuits) allow an external input signal to be inputted via wires (not shown) formed on the surface of the substrate SUB1, and therefore, printed circuit boards which correspond to the above described printed circuit boards PCB1 and PCB2 are not connected in the configuration.

In addition, a backlight BL is provided on the rear surface of the liquid crystal display panel PNL via an optical sheet OS, for example a diffusion sheet, a prism sheet or a multi-layer body of these. The optical sheet OS leads light from the backlight BL to the liquid crystal display panel PNL side through diffusion or condensation.

The backlight BL is referred to as direct backlight, and has a number of external electrode fluorescent lamps EFL of which the longitudinal direction coincides with the direction x in the figure in a plane parallel to the liquid crystal display panel PNL, and which are aligned in the direction y in the figure, and these external electrode fluorescent lamps EFL are supported by the lower frame DFR (see FIG. 3) in box form formed of a metal, for example.

A reflective sheet RS is mounted on the surface of the lower frame DFR, and the upper and lower side portions of this reflective sheet RS, which extend in the direction x in the figure, are bent, so that a side wall surface BW (see FIG. 3) is formed around the raised periphery.

Here, a side wall plate BWh made of a resin material, for example, is provided in the right and left side portions of the lower frame DFR, which extend in the direction y in the figure, so as to have an inclined surface with the edges raised and cover the electrodes at the two ends of the above described external electrode fluorescent lamps EFL. In this side wall plate BWh, notches CC are created, in order to avoid interference with the respective external electrode fluorescent lamps EFL on the lower side.

This side wall plate BWh has a function of reflecting light from the surface on the above described liquid crystal display panel PNL side, and forms a substantial side wall portion of the back light BL, together with the side wall surface BW of the above described reflective sheet RS. The configuration of the back light BL is described in further detail below.

<Configuration of Module>

Figure 3:
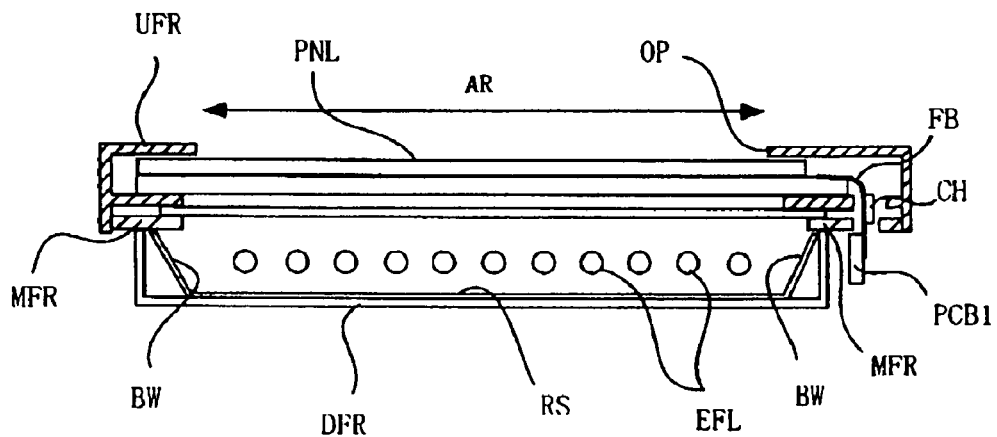
FIG. 3 is a cross sectional diagram showing the configuration of the liquid crystal display device, which is a module, according to the present invention.

In addition, the liquid crystal display panel PNL, the optical sheet OS and the backlight BL are contained by the upper frame UFR and the middle frame MFR, which are respectively secured to the above described lower frame DFR, as shown in FIG. 3, and these frames form a liquid crystal display device as a module. Here, FIG. 3 is a cross sectional diagram showing the portion along line III-III in FIG. 2.

The upper frame UFR has an opening OP for exposing at least the liquid crystal display region AR of the liquid crystal display panel PNL on the viewer side.

Here, the semiconductor devices SCD connected to the substrate SUB1 of the liquid crystal display panel PNL are provided so as to be bent in the portions of the flexible substrates FB, so that the side connected to the printed circuit boards PCB1 and PCB2 is perpendicular to the semiconductor devices. This is in order to make the width of the frame of the liquid crystal display device smaller.

<Backlight BL>

Figure 4A:
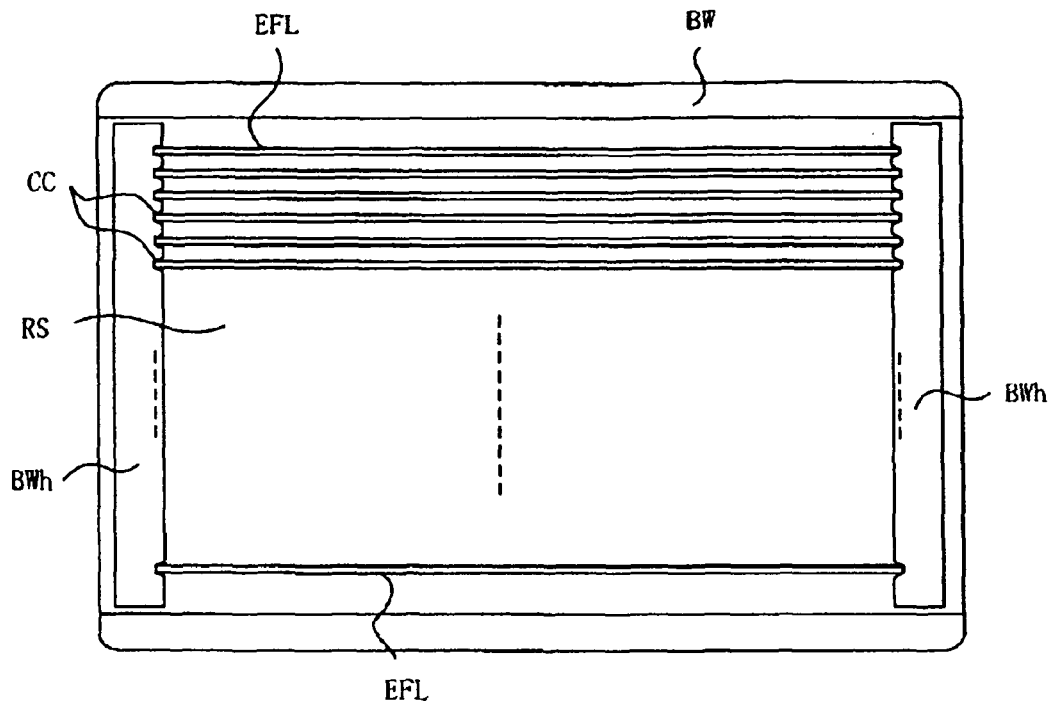
FIGS. 4A and 4B are a diagram showing the configuration of the backlight in the liquid crystal display device according to one embodiment of the present invention.
Figure 4B:
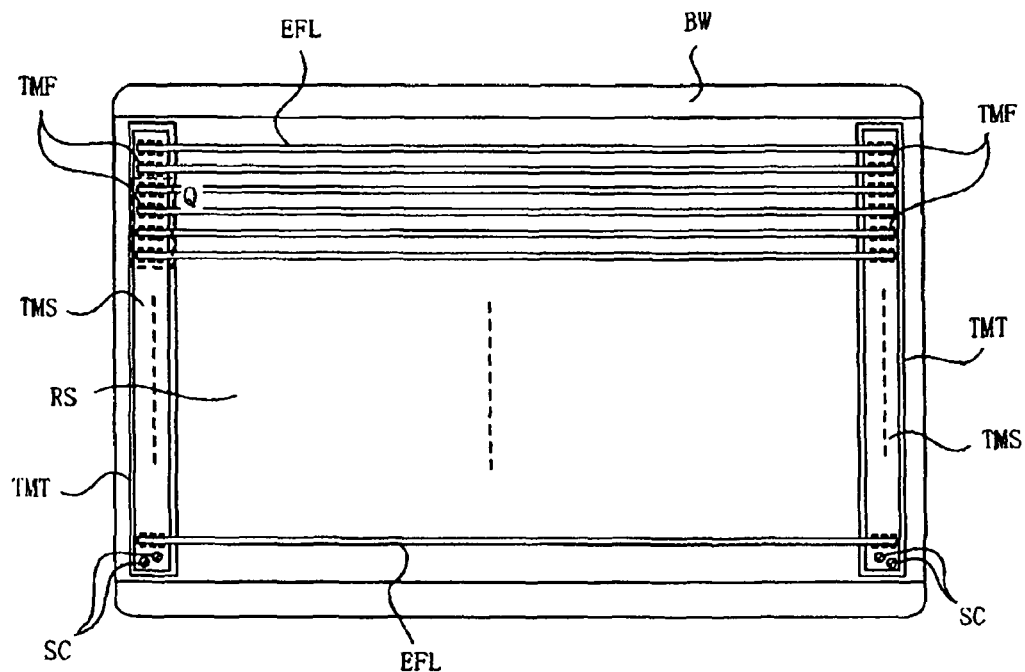

FIG. 4A is a diagram showing only the above described backlight BL shown in FIG. 2, and FIG. 4B is a diagram showing the backlight BL shown in FIG. 4A in a state with the above described side wall plate BWh removed.

The side wall plates BWh are made of a resin material, for example, and provided in the right and left side portions of the lower frame DFR, which extend in the direction y, so as to cover the electrodes of the above described external electrode fluorescent lamps EFL at the two ends and be inclined with the edges raised, as described above.

The side wall plates BWh are provided so as to overlap with the respective electrode bases TMT secured to the lower frame DFR and made of a resin material, for example (see FIG. 4B), and secured with screws, for example, not shown.

In addition, as shown in FIG. 4B, the electrode supports TMS provided on the surface of the electrode bases TFT are exposed when the side plates BWh are removed from the electrode bases TMT.

The left electrode support TMS in the figure is formed so as to have a number of electrode fixtures TMF for supporting and electrically connecting the respective electrodes of a number of external electrode fluorescent lamps EFL aligned on the left in the figure, for example, and in addition, the electrode support TMS on the right in the figure is formed so as to have a number of electrode fixtures for supporting and electrically connecting the electrodes of the above described number of external electrode fluorescent lamps EFL on the right in the figure. THE electrode supports TMS are formed through press processing, together with the electrode fixtures TMF.

Power is supplied to the electrodes of the respective external electrode fluorescent lamps EFL on the left in the figure through the electrode supports TMS on the left in the figure, and power is supplied to the electrodes to the right in the figure through the electrode support TMS on the right in the figure.

The electrode support TMS is secured to the above described electrode base TMT using a screw SC at one end on the lower side in the figure in the longitudinal direction, for example. The electrode support TMT is secured only at one end of the electrode support TMS in the longitudinal direction, in order to prevent the electrode support TMS from bending and lifting off electrode base TFT due to thermal expansion.

Incidentally, in the case where the side wall plate BWh is secured to the electrode base TMT, the above described electrode support TMS is lightly pressed against the electrode support TMT by a number of protruding plates PJB (not shown, see FIGS. 6A and 6B) formed on the surface of the side wall plate BWh on the side which faces the electrode support TMS in the longitudinal direction of the electrode support TMS at certain intervals.

The above described electrode support TM has a simple pattern and is in plate form in FIGS. 4A and 4B, and a number of external electrode fluorescent lamps EFL can be aligned with smaller intervals by providing the below configuration, and thus, a greater number of external electrode fluorescent lamps EFL than in the prior art can be provided.

<Electrode Support TMS>

Figure 1A:
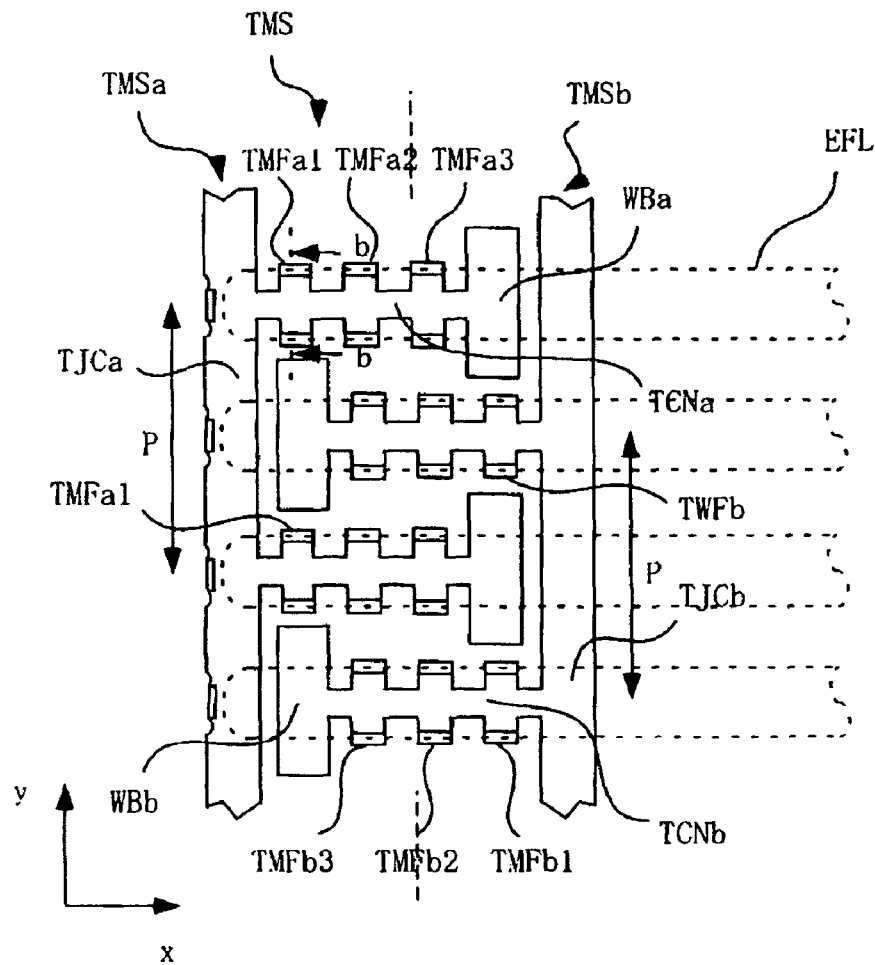
FIGS. 1A and 1B are a is a diagram showing the configuration of the electrode support used in the liquid crystal display device according to one embodiment of the present invention.

FIG. 1A is a plan diagram showing the above described electrode TMS according to one embodiment, and an enlargement of the portion within the dotted line frame Q in FIG. 4B.

Fig 1A shows a typical electrode support TMS provided on the left side of the black light BL shown in FIGS. 4A and 4B, and accordingly, the electrode support TMS provided on the right side in the figure also has the same configuration, except that left and right are reversed. In addition, FIG. 1A clearly shows an external electrode fluorescent lamp EFL with dotted lines and the positional relationship between this external electrode fluorescent lamp EFL and the electrode support TMS.

In FIG. 1A, the above described electrode support TMS is formed of separate electrode supports TMSa and TMSb. That is to say, the electrode supports TMSa and TMSb are manufactured separately and provided on the upper surface of the above described electrode base TMT (not shown) so as to have the positional relationship shown below. Here, in this specification, the electrode support TMSa is in some cases referred to as first electrode support, and the electrode support TMSb is in some cases referred to as second electrode support.

In addition, the electrode supports TMSa and TMSb are formed together with the below described electrode fixtures TMF, by press processing a metal plate.

First, the electrode support TMSa has an electrode linking body TJCa which extends in the longitudinal direction of the above described electrode base TMT (not shown) (direction y in figure).

A number of electrode fixtures TMF for sandwiching one electrode for the external electrode fluorescent lamp EFL are connected to the electrode connecting body TJCa.

Three electrode fixtures TMF (for example those shown by the symbols TMFa1, TMFa2 and TMFa3 in the figure) are provided for the same electrode of the external electrode fluorescent lamp EFL, and aligned at equal intervals in the longitudinal direction of the electrodes, so that reliable electrical connection can be made with the electrodes. In addition, the three electrode fixtures TMF are respectively connected to the electrode connecting bodies TCNa in the configuration.

That is to say, the above described electrode connecting bodies TCNa are formed so as to be directed toward the center of the backlight BL relative to the above described electrode linking body TJCa and extend in the direction perpendicular to the longitudinal direction of the electrode linking body TJCa (direction x in figure), and provided at equal intervals (for example P) in the longitudinal direction of the base support.

Here, the respective electrode fixtures TMF formed in the respective electrode connecting bodies TCNa provided in parallel to the direction y in the figure in such a positional relationship that the respective electrode fixtures TMF corresponding to the electrode fixtures denoted by the symbol TMFa1, the respective electrode fixtures TMF corresponding to the electrode fixtures denoted by the symbol TMFa2 and the respective electrode fixtures TMF corresponding to the electrode fixtures denoted by the symbol TMFa3 are aligned in lines in the direction y, without shifting in the direction x in the figure, in this embodiment.

However, the invention is not limited to this, and the respective electrode fixtures TMF corresponding to electrode fixtures denoted by the same symbol may have such a positional relationship as to be aligned in the direction y with a slight shift in the direction x in the figure.

The respective electrode fixtures TMF are formed of forked members which rise from the two sides of the electrode connecting body CTNa, as shown in the cross sectional diagram along line b-b in FIG. 1A, and formed of electrode holding portions TN in arc form for pressing the sides of the electrodes of the above described external electrode fluorescent lamps EFL (indicated by dotted line in figure) and electrode inserting openings TI which spread outward from the electrode holding portions TN and make insertion of the above described external electrode fluorescent lamps EFL easy.

In addition, wide portions WBa having a portion which extends in the direction perpendicular to the longitudinal direction of the electrode connecting bodies TCNa from each side are formed in extending ends of the electrode connecting bodies TCNa, where the electrode fixtures TMF are formed on the side opposite to the above described electrode linking bodies TJCa. The function of these wide portions WBa are described in detail below in reference to FIGS. 6A and 6B.

In addition, the electrode support TMSb has an electrode linking body TJCb which extends in the direction of the longitudinal direction of the above described electrode base TMT (not shown) (direction y in figure), and the electrode linking body TJCb is provided on the right of the above described electrode support TMSa in the figure, that is to say, at the center of the backlight BL.

The electrode linking body TJCb is formed integrally with the electrode connecting body TCNb, where the electrode fixture TMF is formed. The electrode connecting bodies TCNb are formed so as to be directed to the left of the electrode linking body TJCb in the figure, that is to say, to the side opposite to the center of the backlight BL, and extend in the direction perpendicular to the longitudinal direction of the electrode connecting body TJCb (direction x in figure), and provided at equal intervals (for example P) in the longitudinal direction of the electrode connecting body TJCb.

In this case, the electrode connecting bodies TCNb of the electrode supports TMSb are respectively located between the electrode connecting bodies TCNa adjacent to the above described electrode supports TMSa, and are in such a relationship as to interlock with the electrode connecting bodies TCNa of the above described electrode supports TMSa.

Figure 1B:
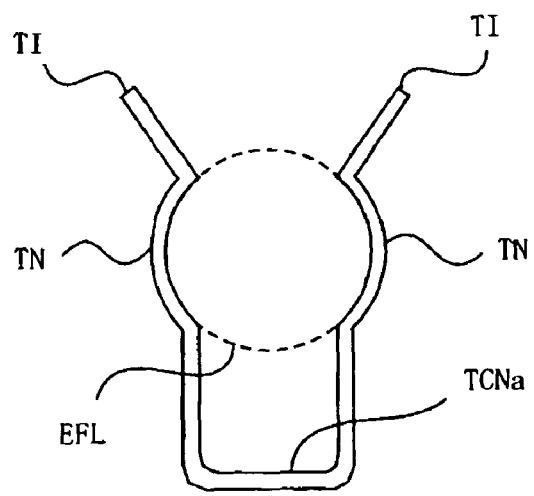

In addition, in each of the above described electrode connecting bodies TCNa, three electrode fixtures (denoted by symbols TMFb1, TMFb2 and TMFb3 in figure) are formed at equal intervals in the direction in which the electrode connecting bodies TCNb extend from the above described electrode connecting bodies TJCa. The respective electrode metals TNF have the same configuration as the electrode fixtures TMF of the above described electrode supports TMSa, and thus, have the same configuration as shown in FIG. 1B.

In addition, wide portions WBb having an extending portion from each side in the direction perpendicular to the longitudinal direction of the electrode connecting body TCNb are formed in the end portion of the electrode connecting bodies TCNb of the electrode support TMSb, as in the end portion of the electrode connecting bodies TCNa of the above described electrode support TMSa. The function of these wide portions WBb is described in detail below in reference to FIGS. 6A and 6B, together with the function of the above described wide portions WBa of the above described electrode support TMSa.

Here, the electrode fixtures TMF respectively formed in the electrode connecting bodies TCNb provided in parallel to the direction y in the figure are in such a positional relationship that the respective electrode fixtures TMF corresponding to the electrode fixtures denoted by the symbol TMFb1, the respective electrode fixtures TMF corresponding to the electrode fixtures denoted by the symbol TMFb2 and the respective electrode fixtures TMF corresponding to the electrode fixtures denoted by the symbol TMFb3 are aligned in lines in the direction y, without shifting in the direction x in the figure, in this embodiment.

However, the invention is not limited to this, and the respective electrode fixtures TMF corresponding to electrode fixtures denoted by the same symbol may have such a positional relationship as to be aligned in the direction y with a slight shift in the direction x in the figure in other embodiments.

Effects of Present Embodiment

The thus formed electrode supports TMS allow the electrode connecting bodies TCNa and TCNb which are respectively combined with the electrode supports TMSa and TMSb for use to be provided with small intervals of P/2. Thus, a number of external electrode fluorescent lamps EFL can be provided with small intervals, and more external electrode fluorescent lamps EFL can be provided than in the prior art.

Here, in the case where the above described electrode supports TMS are formed of one electrode support: the electrode support TMSa or the electrode support TMSb, the lower limit for the intervals is P, for example, even when the intervals of the electrode connecting bodies TNS are reduced in the configuration. In other words, there is a limit in the intervals between the respective electrode connecting bodies TCN, and the intervals cannot be reduced more than a certain amount (for example to P or less).

Figure 5A:
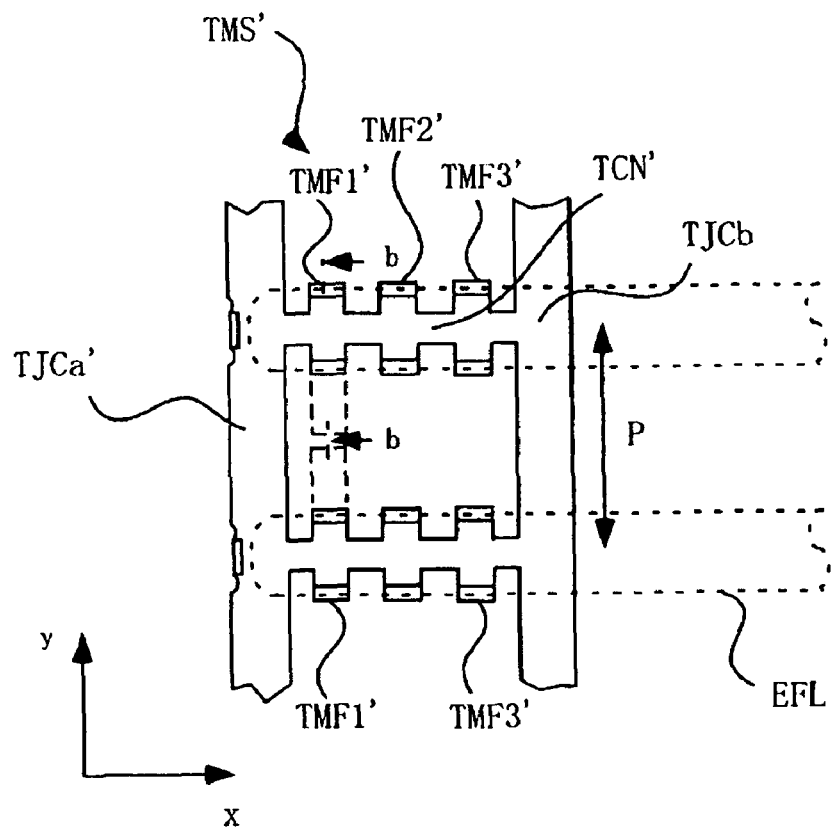
FIGS. 5A and 5B are a diagram showing an example of the configuration of an electrode support used in conventional liquid crystal display devices, and illustrating the disadvantage thereof.

That is to say, FIG. 5A is a plan diagram showing an example of the configuration of a conventional electrode support TMS'.

This electrode support TMS' can be formed by press processing a metal plate, as with the electrode supports TMSa and TMSb shown in FIGS. 1A and 1B.

The electrode supports TMS' first have a pair of electrode linking bodies TJCa' and TJCb' provided in parallel which extend in the longitudinal direction of the electrode support (not shown) (direction y in figure).

Electrode connecting bodies TCN' are integrally formed between electrode linking bodies TJCa' and TJCb' so as to extend in the direction x in the figure, and these electrode connecting bodies TCN' are provided at intervals P in the direction y in the figure.

Figure 5B:
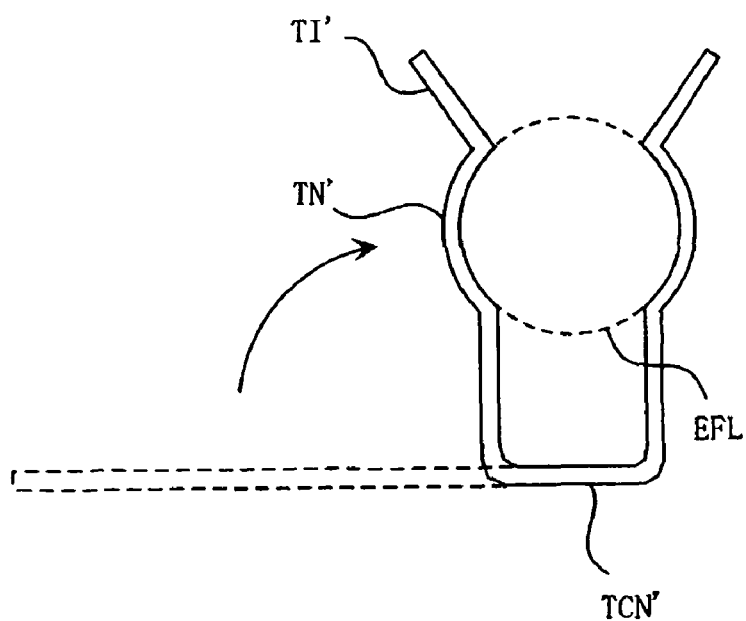

Thus, three electrode fixtures TMF (denoted by symbols TMF1', TMF2' and TMF3' starting from the electrode linking body TJCa' side), for example, are formed at equal intervals in the longitudinal direction of each electrode connecting body TCN'. The configuration of these electrode fixtures is shown in FIG. 5B, which is a cross sectional diagram along line b-b in FIG. 5A. This is the same configuration as in FIG. 1B.

Here, the respective electrode fixtures formed in each electrode connecting body TCN' aligned in the direction y in the figure are in such a positional relationship that the electrode fixtures TMF corresponding to the electrode fixtures denoted by the symbol TMF1', the electrode fixtures TMF corresponding to the electrode fixtures denoted by the symbol TMF2' and the electrode fixtures TMF corresponding to the electrode fixtures denoted by symbol TMF3' are respectively aligned in a line in the direction y without shifting in the direction x in the figure.

As shown in FIG. 5B, the electrode holding portion TN' and the electrode inserting portion TI' in the electrode fixture TMF of the electrode supports TMS' are formed by bending a portion of a metal plate that has been punched out.

As described above, the location of the electrode connecting bodies TCN' must be set as in FIG. 5A where the electrode holding portion TN' and the electrode inserting portion TI' of the electrode fixture TMF' (shown by dotted lines in figure) and the electrode holding portion TN' and the electrode inserting portion TI' of another electrode fixture TMF' (shown by dotted lines in figure) adjacent to the electrode fixture TMF' in the direction y do not interfere with each other. Accordingly, the intervals between adjacent electrode connecting bodies TCN' are P in this case, and the value of P cannot be reduced any more.

As described above with relation to the electrode supports TMS shown in FIGS. 1A and 1B, even in the case where the intervals between the electrode connecting bodies TCNa and the electrode connecting bodies TCNb are not gained as the minimum value B in the electrode support TMSa or the electrode support TMSb, the above described electrode support TMSa and electrode support TMSb are provided so that the electrode connecting bodies TCNa and the electrode connecting bodies TCNb alternate, so that the intervals between the electrode connecting bodies (in this case electrode connecting bodies TCNa and electrode connecting bodies TCNb) can be set to P/2.

Accordingly, a number of external electrode fluorescent lamps EFL can be provided with small intervals, so that light can be made uniform in a plane parallel to and at a slight distance from the plane including the external electrode fluorescent lamps EFL, and the above described liquid crystal display panel PNL can be provided in the above described plane where light can be made uniform.

As a result, the liquid crystal display panel PNL and the backlight BL (specifically, the external electrode fluorescent lamps EFL) can be provided close to each other, and thus, the thickness of the module can be released.

<Effects of Wide Portions WB>

Next, the effects of the wide portions WBa and WBb which are respectively formed in the electrode supports TMSa and TMSb as shown in FIGS. 1A and 1B are described.

The side wall plate BWh is secured to the electrode base TMT for providing the electrode support TMS shown in FIG. 1A so as to cover the electrode support TMS, as described above.

Figure 6A:
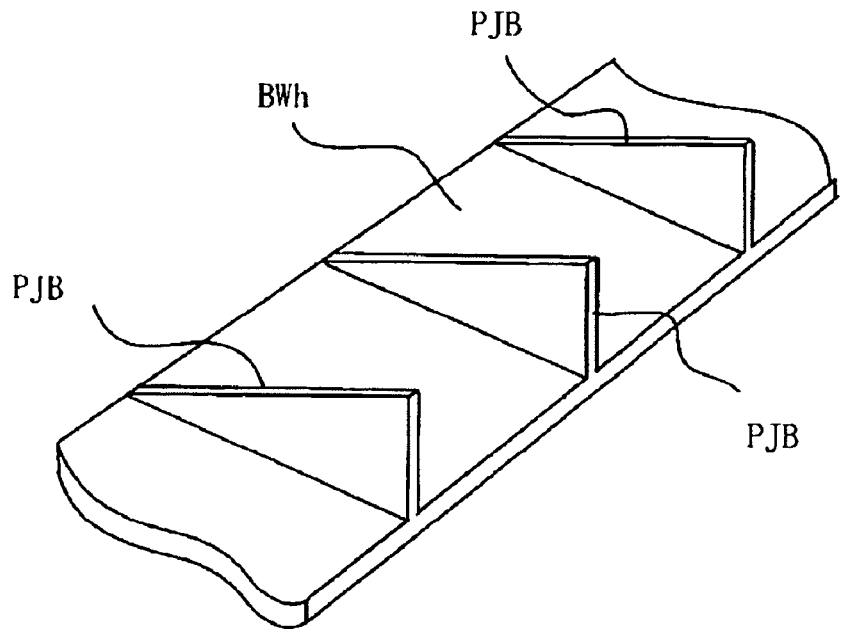
FIGS. 6A and 6B are a diagram illustrating the effects of the electrode support used in the liquid crystal display according to one embodiment of the present invention.

The surface of this side wall plate BWh has a light reflecting function, and a protruding plate PJB for lightly pressing the above described electrode support TMS toward the electrode base TMT is formed on the rear surface, as shown in FIG. 6A. This protruding plate PJB is aligned in the longitudinal direction of the side wall plate BWh, with the side perpendicular to the longitudinal direction of the side wall plate BWh.

Here, FIG. 6A shows the state of the side wall plate BWh placed on the left of the backlight BL shown in FIG. 4A with the left and right reversed as seen from the back. The above described protruding plate PJB is in triangular form because the above described side wall plate BWh is inclined, so as to be low at the center of the backlight BL and high on the outside.

The above described projecting plate PJB is provided between adjacent external electrode fluorescent lamps EFL in the case where the side wall plate BWh is attached to the above described electrode base TMT, for example.

Figure 6B:
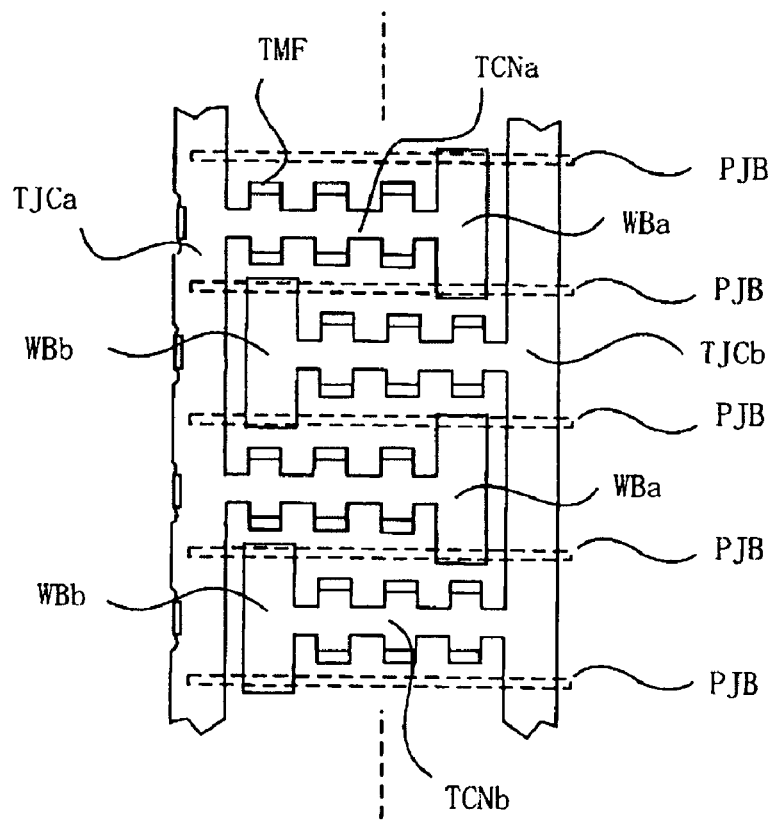

FIG. 6B is a diagram showing the positional relationship of the above described protruding plate PJB relative to the electrode support TMS on the electrode base TMT when the above described side wall plate BWh is attached to the above described electrode base TMT, and the above described protruding plate PJB is shown by dotted lines.

Here, the wide portions WBa and WBb formed on the electrode supports TMSa and TMSb, respectively, are provided so as to overlap with the dotted line where the protruding plate PJB is provided. That is to say, each of the above described protruding plates PJB can press the wide portion WBa, in addition to the electrode linking body TJCa in the electrode support TMSa, and in addition, the wide portion WBb can also be pressed, in addition to the electrode linking body TJCb in the electrode support TMSb.

Therefore, each electrode support can make contact with the electrode base TMT at two points: the electrode linking body and the wide portion, and thus, the disadvantage of the electrode support lifting off from the electrode base TMT can be avoided, thanks to the wide portion.

Another Embodiment 1

In the above described embodiment, the electrode supports TMSa and the electrode supports TMSb are provided at a distance from each and do not overlap on the electrode base TMT.

Figure 7:
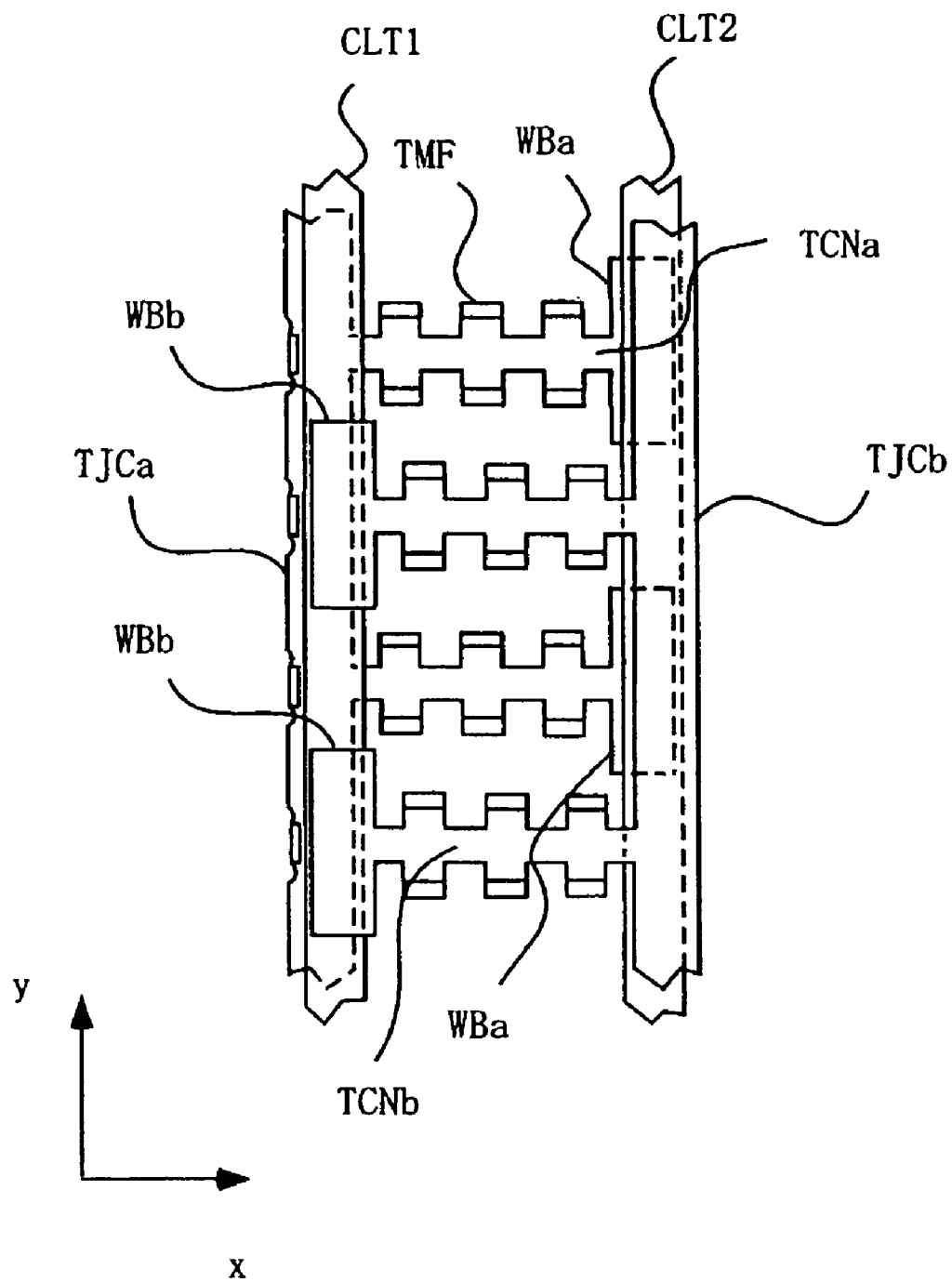
FIG 7 is a diagram showing a modification of the electrode support used in the liquid crystal display according to one embodiment of the present invention.

As shown in FIG. 7, however, the electrode supports TMSb shift toward the electrode supports TMSa in the direction x in the figure, so that the wide portions WBb of the electrode supports TMSb overlap above the electrode joining bodies TJCa of the above described supports TMSa. In this case, the wide portions WBa of the electrode supports TMSa overlap beneath the electrode joining bodies TJCb of the above described electrode supports TMSb.

In this case, the width of the assembly of the above described electrode supports TMSa and electrode TMSb can be reduced in the direction x in the figure. As a result, such effects can be gained that the area of the so-called frame portion of the liquid crystal display device (portion in periphery of display region of display device) can be reduced.

Here, FIG. 7 is a diagram corresponding to FIG. 1A, and symbols which are the same as in FIG. 1A indicate components which are the same.

In addition, in FIG. 7, wide portions WBb of the electrode supports TMSb overlap above the electrode joining bodies TJCa of the electrode supports TMSa via unwoven cloth (frictional noise reducing material) CLT1 in the longitudinal direction of the electrode joining bodies TJCa. In addition, the electrode joining bodies TJCb of the electrode supports TMSb overlap above the respective wide portions WBa of the electrode supports TMSa via unwoven cloth CLT2 which extends over all of the wide portions WBa.

Here, the above described unwoven cloth CLT1 and CLT2 intervene in the portion where the electrode supports TMSa and the electrode supports TMSB overlap in order to prevent squealing noise when the electrode supports TMSa and the electrode supports TMSb rub against each other.

Here, though in the case of the embodiment shown in FIG. 7, the electrode supports TMSa are located beneath the electrode supports TMSb, the invention is not limited to this, and the same effects can be gained when the electrode supports TMSa are located above the electrode supports TMSb.

Another Embodiment 2

Figure 8A:
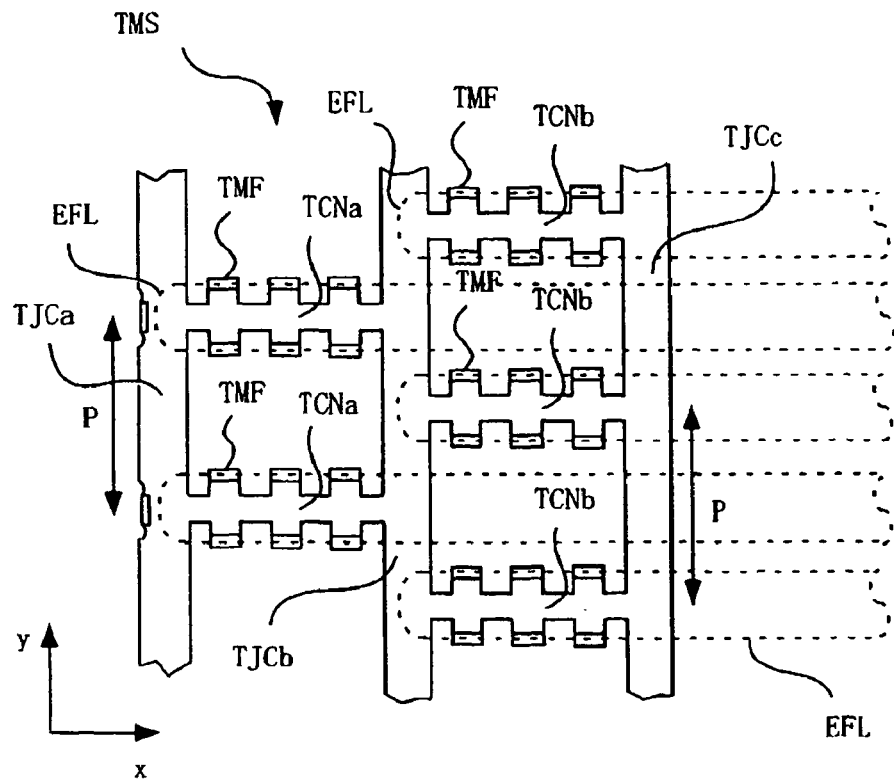
FIGS. 8A and 8B are a diagram showing the configuration of the electrode support used in the liquid crystal display device according to another embodiment of the present invention.

FIG. 8A is a plan diagram showing the electrode support TMS according to another embodiment. The electrode support TMS according to the present embodiment is integrated.

In FIG. 8A, The electrode support TMS is provided with three electrode joining bodies TJCa, TJCb and TJCc, and these electrode joining bodies TJCa, TJCb and TJCc extend in the longitudinal direction (direction y in figure) of the electrode base TMT (not shown), and are aligned at equal intervals.

A number of electrode connecting bodies TCNa to which metal fixtures TMF are attached are formed between the electrode joining body TJCa and the electrode joining body TJCb at equal intervals P in the direction y in the figure. Likewise, a number of electrode connecting bodies TCNb to which electrode fixtures TMF are attached are formed between the electrode joining body TJCb and the electrode joining body TJCc at equal intervals P in the direction y in the figure.

In this case, the electrode connecting bodies TJCa formed between the electrode joining bodies TJCa and the electrode joining bodies TJCb and the electrode connecting bodies TJCb formed between the electrode joining bodies TJCb and the electrode joining bodies TJCc shift by a half pitch. That is to say, judging from the positional relationship only in the direction y in the figure, one of the above described electrode connecting bodies TCNb is located between adjacent electrode connecting bodies TCNa and one of the above described electrode connecting bodies TCNa is located between adjacent electrode connecting bodies TCNb.

The configuration of the respective electrode fixtures TMF formed in the above described electrode connecting bodies TCNa and TCNb is the same as shown in FIG. 1B.

The thus formed electrode supports TMS have limitations, in that the electrode connecting bodies TCNa and the electrode connecting bodies TCNb formed in parallel in the direction Y in the figure must maintain intervals P between adjacent electrode connecting bodies, for example. In direction y in the figure, however, one of the electrode connecting bodies TCNb is located between adjacent electrode connecting bodies TCNa and one of the electrode connecting bodies TCNa is located between adjacent electrode connecting bodies TCNb in the configuration, and thus, the electrode connecting bodies made of the electrode connecting bodies TCNa and TCNb substantially become equivalent as provided at intervals P/2 in the direction y in the figure.

The thus formed electrode supports allow the external electrode fluorescent lamps EFL (shown by dotted lines) to be provided as shown in FIG. 8A. That is to say, the external electrode fluorescent lamps EFL supported by the respective electrode fixtures TMF in the electrode connecting bodies TCNa and the external electrode fluorescent lamps EFL supported by the respective electrode fixtures TMF in the electrode connecting bodies TCNb shift in the direction x in the figure.

In this case, the electrode supports on the other end side of the external electrode fluorescent lamps EFL are formed to have the same configuration as the electrode supports shown in FIG. 8A, and the external electrode fluorescent lamps EFL shift left and right every other column in the direction x. As a result, it becomes possible to use external electrode fluorescent lamps EFL having the same length.

Figure 8B:
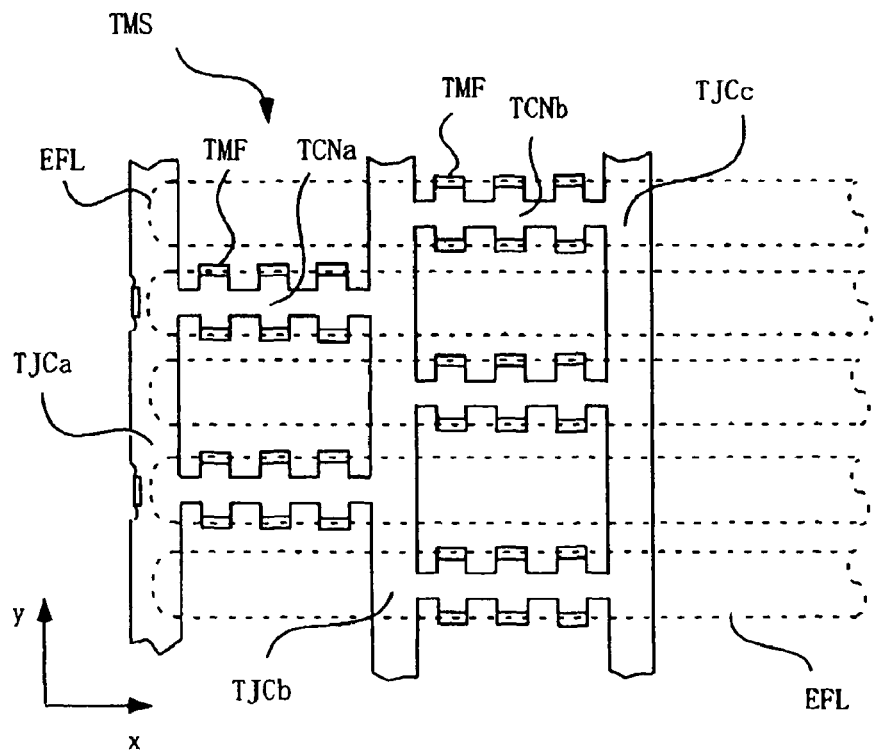

In addition, it is not necessary for the external electrode fluorescent lamps to be arranged as in FIG. 8A, and the external electrode fluorescent lamps EFL may be provided so as not to shift in the direction x in the figure, as shown in FIG. 8B, for example. In this case, modification is possible by making the electrodes of the respective external electrode fluorescent lamps EFL have a length corresponding to the width of the electrode supports TMS from the electrode joining body TJCa to the electrode joining body TJCc, for example.

Another Embodiment 3

Figure 9:
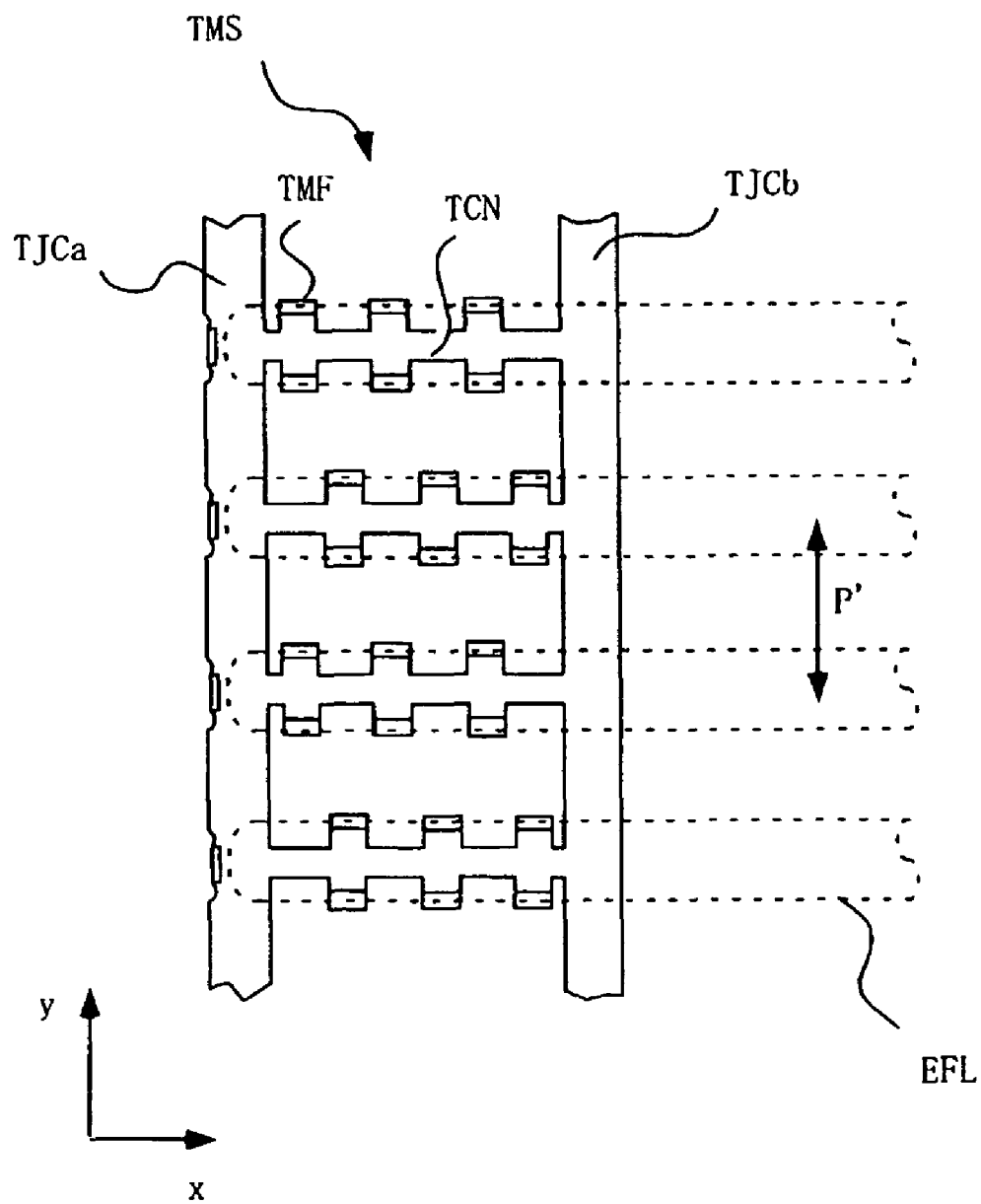
FIG. 9 is a diagram showing the configuration of the electrode support used in the liquid crystal display device according to another embodiment of the present invention.

FIG. 9 is a plan diagram showing the electrode support according to another embodiment. The electrode support TMS according to the present invention is also integrated.

In FIG. 9, the electrode support TMS is provided with a pair of electrode joining bodies TJCa and TJCb, and these electrode joining bodies TJCa and TJCb are aligned in parallel so as to extend in the longitudinal direction of the electrode base TMT (not shown) (direction y in figure).

A number of electrode connecting bodies TCN to which electrode fixtures TMF are attached are formed at equal intervals in the direction y in the figure, between the electrode joining body TJCa and the electrode joining body TJCb.

Three electrode fixtures TMF, for example, are formed in the respective electrode connecting bodies TCN at equal intervals in the longitudinal direction, and thus, the configuration of the respective electrode fixtures is the same as in FIG. 1B, for example.

In this case, the respective electrode fixtures TMF formed in an electrode connecting body TCN and the respective electrode fixtures TMF formed in another electrode connecting body TCN adjacent to the electrode connecting body TCN shift by the width of the electrode fixtures TMF in the direction x. That is to say, even in the case where all of the electrode fixtures TMF are expanded in a plane, the positional relationship prevents them from interfering with each other.

Thus, in the case where the configuration in FIG. 9 is formed of one metal plate, the interval between electrode connecting bodies TCN can allow at least one electrode fixture TMF to be formed.

Accordingly, the interval between the electrode connecting bodies TCN which are aligned adjacent to each other can be set to a value P', which is smaller than the above described value P (P'<P).

Though in the above described embodiments, three electrode fixtures TMF are formed in the electrode connecting bodies TCN, TCNa and TCNb, the invention is not limited to this.

The above described embodiments may be used alone or combined for use. This is because the effects of the respective embodiments can be gained alone or in combination.

The invention claimed is:

1. A liquid crystal display device, comprising:
   a liquid crystal display panel; and
   a backlight provided on a rear surface of the liquid crystal display panel, wherein
   said backlight comprises a plurality of rod light sources installed in parallel and extending in a first direction, and electrode supports for supporting electrodes of the plurality of rod light sources together,
   said electrode supports include a pair of electrode joining bodies that are elongated in a second direction that is perpendicular to the first direction, plurality of electrode connecting bodies arranged between the pair of electrode joining bodies and extending in the first direction, and a plurality of electrode fixtures for sandwiching the electrodes of said rod light sources connected to corresponding electrode connecting bodies of the plurality of electrode connecting bodies,
   said electrode fixtures are formed in respective sets of three electrode fixtures aligned in the first direction on each of said corresponding electrode connecting bodies, and
   each respective set of three electrode fixtures are arranged in a position on the corresponding electrode connecting body so as not to align with the electrode fixtures arranged on any electrode connecting body that is adjacent to the corresponding electrode connecting body in the second direction.

\* \* \* \* \*